US011173767B2

United States Patent
Cox

(10) Patent No.: US 11,173,767 B2
(45) Date of Patent: Nov. 16, 2021

(54) HYDRAULIC ANTI-ROLL BAR LINK

(71) Applicant: Christopher Cox Creative, Jordan, UT (US)

(72) Inventor: Christopher Paul Cox, West Jordan, UT (US)

(73) Assignee: Christopher Cox Creative, Park City, UT (US)

( * ) Notice: Subject to any disclaimer, the term of this patent is extended or adjusted under 35 U.S.C. 154(b) by 107 days.

(21) Appl. No.: 16/660,607

(22) Filed: Oct. 22, 2019

(65) Prior Publication Data
US 2021/0114431 A1    Apr. 22, 2021

(51) Int. Cl.
*B60G 21/073*    (2006.01)
*B60G 17/08*    (2006.01)

(52) U.S. Cl.
CPC ......... *B60G 21/073* (2013.01); *B60G 17/08* (2013.01); *B60G 2202/24* (2013.01); *B60G 2206/012* (2013.01); *B60G 2206/41* (2013.01); *B60G 2500/11* (2013.01)

(58) Field of Classification Search
CPC .... B60G 21/073; B60G 21/10; B60G 21/106; B60G 17/08; B60G 2202/24; B60G 2500/11; B60G 2206/012; B60G 2206/41
See application file for complete search history.

(56) References Cited

U.S. PATENT DOCUMENTS

| 2,941,815 | A | * | 6/1960 | Muller | B60G 17/0277 |
| | | | | | 280/124.107 |
| 4,159,756 | A | * | 7/1979 | Murakami | F16F 9/44 |
| | | | | | 188/282.5 |
| 4,589,528 | A | * | 5/1986 | Axthammer | F16F 9/466 |
| | | | | | 188/266.2 |
| 4,958,704 | A | * | 9/1990 | Leiber | F16F 9/368 |
| | | | | | 188/267 |
| 5,035,306 | A | | 7/1991 | Ashiba | |
| 5,172,794 | A | * | 12/1992 | Ward | F16F 9/092 |
| | | | | | 188/282.8 |
| 5,522,280 | A | * | 6/1996 | Bexten | B60S 1/24 |
| | | | | | 15/250.3 |
| 6,276,693 | B1 | | 8/2001 | Oakely et al. | |

(Continued)

OTHER PUBLICATIONS

International Search Report and Written Opinion received for counterpart International Application No. PCT/US2020/056869, dated Jan. 12, 2021 (11 pages).

*Primary Examiner* — Frank B Vanaman
(74) *Attorney, Agent, or Firm* — Perkins Coie LLP

(57) ABSTRACT

An anti-roll bar link for a vehicle suspension may be positioned between an anti-roll bar and an articulating arm. The link selectively transfers movement of the arm to the bar, depending on a locked or unlocked state. The link includes a body interfacing a slidable shaft. A valve selectively controls flow of a damping fluid between an inner chamber of the body and a remote chamber. In the locked state, flow of the damping fluid is restricted at least in a direction from the inner chamber to the remote chamber, and movement of the arm is transferred through the link to the bar. In the unlocked state, flow of the damping fluid is permitted in this direction, and movement of the arm causes the shaft to translate with respect to the body such that at least a portion of the movement is not transferred to the bar.

20 Claims, 12 Drawing Sheets

(56) References Cited

U.S. PATENT DOCUMENTS

| | | | |
|---|---|---|---|
| 6,457,730 B1 * | 10/2002 | Urbach | B60G 17/0162 |
| | | | 280/124.161 |
| 6,520,510 B1 | 2/2003 | Germain et al. | |
| 7,234,714 B2 * | 6/2007 | Germain | B60G 17/0162 |
| | | | 267/220 |
| 8,220,807 B2 * | 7/2012 | Lorenzon | B60G 21/0553 |
| | | | 280/124.106 |
| 2007/0235955 A1 | 10/2007 | Mizukoshi et al. | |
| 2010/0225084 A1 | 9/2010 | Chapman et al. | |
| 2015/0083535 A1 | 3/2015 | Ericksen et al. | |
| 2016/0265615 A1 | 9/2016 | Marking | |
| 2017/0129302 A1 | 5/2017 | Jackson | |
| 2017/0282669 A1 | 10/2017 | Cox et al. | |

* cited by examiner

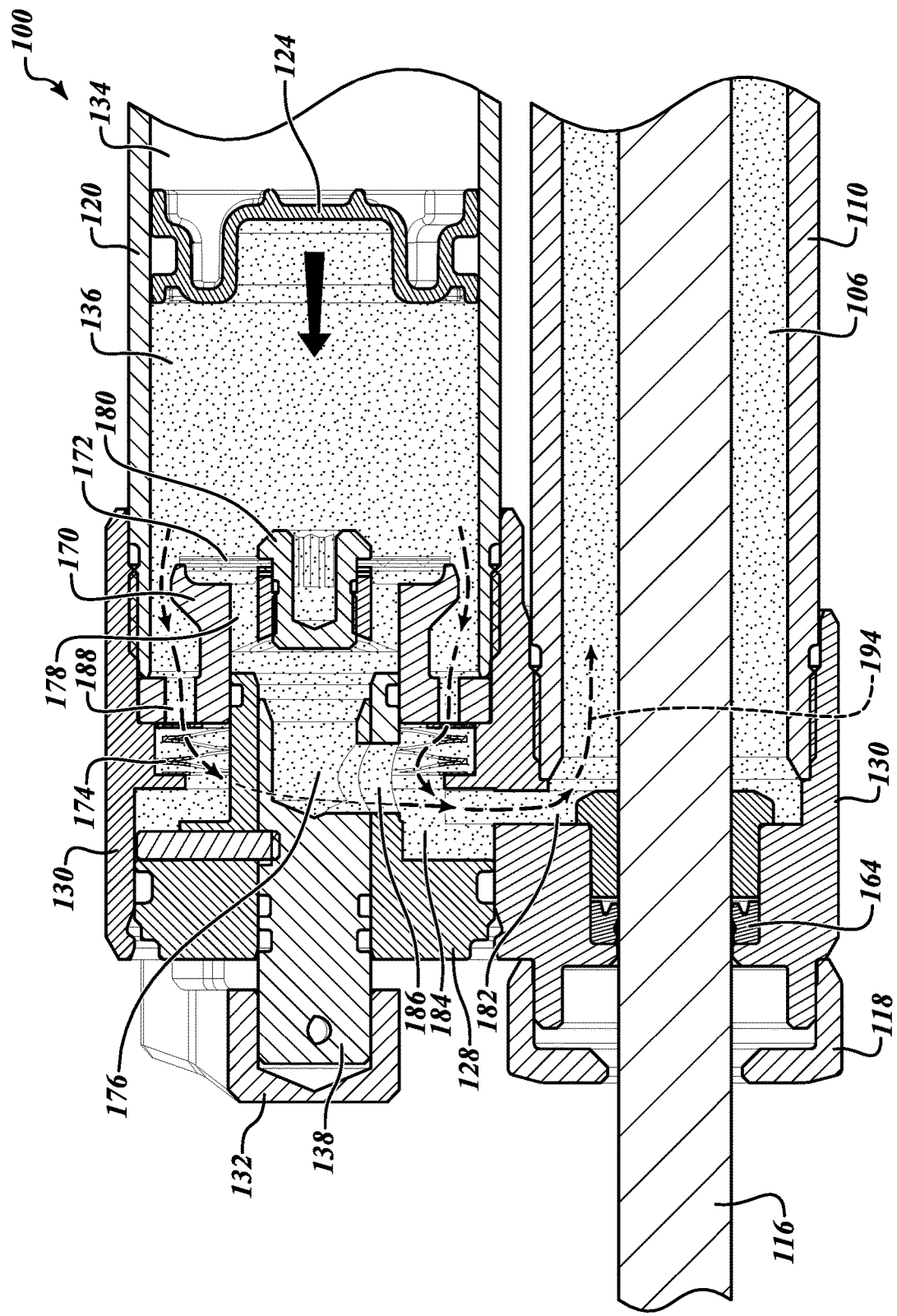

HYDRAULIC ANTI-ROLL BAR LINK

TECHNICAL FIELD

The present technology generally relates to a hydraulic anti-roll bar link configured to selectively provide increased suspension articulation in vehicles having an anti-roll bar.

BACKGROUND

An anti-roll bar (or anti-sway bar) is a common component in automotive suspensions to help reduce the body roll of a vehicle during cornering and other dynamic events causing suspension articulation. In general, an anti-roll bar is connected between the suspension assemblies of the left and right side of a vehicle to transfer an amount of articulation between the sides. In some configurations, both front and rear anti-roll bars are used on a four-wheel vehicle. The anti-roll bar provides compensation to the suspension on one side of the vehicle when the suspension on the other opposing side is articulated, e.g. compressing the left rear wheel suspension when the right rear wheel suspension is compressed through vehicle cornering and/or traveling over road irregularities. In this regard, the anti-roll bar can work to compress or extend the suspension of the opposite side of the vehicle to maintain the left and right side at similar heights.

In such anti-roll bar configurations, when one side of the suspension articulates, the anti-roll bar system imparts a torsional force through the bar and links to the other side of the connected suspension components. FIG. 1 shows a conventional anti-roll bar configuration having a bar a rigid link 2 connecting the bar 1 to an axle 3, and a spring 4 providing counter-resistance to input compression forces. For clarity, other common components of the suspension and vehicle systems have been omitted. In these conventional configurations, the links connecting the anti-roll bar to the suspension components are generally rigid, such that the torsional forces of the bar are directly transferred to the suspension components during articulation. In some road configurations, such as rough or broken pavement, anti-roll bars can produce jarring side-to-side body motions (a "waddling" sensation), which increase in severity with the diameter and stiffness of the anti-roll bar. Further, excessive roll stiffness, which is typically a result of overly aggressive anti-roll bar setups, can cause the inside wheels to lift off the ground during hard cornering and other suspension articulation maneuvering.

Disconnecting the anti-roll bars may be desirable in certain situations where high-articulation of the suspension is beneficial, such as off-road or when traversing rugged terrain. When the anti-roll bars are disconnected, the suspension at each corner of the vehicle can articulate to a larger extent since the forces acting on the wheel in any given corner of the vehicle are imparted into only the suspension components in that corner. During off-road use, such increased articulation may improve the ability of the vehicle to traverse rugged terrain; however, vehicles can become unstable with the anti-roll bars disconnected, and are typically only usable at very low vehicle speeds due to undamped side-to-side motion.

SUMMARY

In accordance with one embodiment of the present technology, a hydraulic anti-roll bar link for a vehicle suspension is provided. The hydraulic anti-roll bar link can be switched between different states, such as a locked state, an unlocked state, etc. In the locked state, the hydraulic anti-roll bar link can function as a fixed-length link coupled to a suspension arm and an anti-roll bar. In the unlocked state, the hydraulic anti-roll bar link can extend to, for example, increase suspension travel, provide suspension dampening (e.g., passive dampening, adaptive dampening, semi-active dampening), or the like. For example, the hydraulic anti-roll bar links can be in the locked state when traveling along paved roads and can be in the unlocked state when off-roading or traversing rugged terrain. The hydraulic anti-roll bar links can include manually accessible control elements used to change the state of the links when the vehicle (e.g., truck, car, dune buggy, all-terrain vehicle, off-road vehicle, etc.) is stationary. This allows the front suspension to operate differently than the rear suspension. For example, front hydraulic anti-roll bar links can be set to a first setting while rear hydraulic anti-roll bar links can be set to a second setting, which may be different from the first setting. In other modes, each hydraulic anti-roll bar link can be set to the same setting. In some embodiments, the hydraulic anti-roll bar links can be in communication a controller (e.g., an electronic control unit, a suspension controller, etc.) programmed to change the state of one or more of the hydraulic anti-roll bar links on the fly while seated in or otherwise operating the vehicle. The controller can also coordinate operation of the hydraulic anti-roll bar links and the suspension system based on one or more sensor inputs (e.g., an adaptive suspension system, a semi-active suspension system, etc.).

In accordance with one embodiment of the present technology, an anti-roll bar link for a vehicle suspension is provided. The anti-roll bar link generally includes an elongate body having a central bore defining an inner chamber configured to retain a damping fluid, the elongate body having an aperture at a distal end; a shaft extending through the aperture, the shaft having a piston fixed to a proximal end and slidingly disposed within the inner chamber; a reservoir body enclosing a remote chamber fluidly coupled to the inner chamber through a passageway; and a valve configured to selectively control flow of the damping fluid within the passageway. The valve may be positionable between a locked state for restricting the flow of the damping fluid from the inner chamber to the remote chamber, and an unlocked state for permitting the flow of the damping fluid from the inner chamber to the remote chamber.

In accordance with another embodiment of the present technology, an anti-roll bar system for a vehicle suspension is provided. The anti-roll bar system generally includes an anti-roll bar; and an anti-roll bar link configured to transfer movement of an articulating arm of the vehicle suspension to the anti-roll bar. The anti-roll bar link includes an elongate body having a central bore defining an inner chamber configured to retain a damping fluid, the elongate body having an aperture at a distal end; a shaft couplable at a distal end to one of the anti-roll bar and the articulating arm, the shaft extending through the aperture and having a piston fixed to a proximal end slidingly disposed within the inner chamber; a reservoir body enclosing a remote chamber fluidly coupled to the inner chamber through a passageway; and a valve configured to selectively control flow of the damping fluid within the passageway. The valve may be positionable between a locked state for restricting the flow of the damping fluid from the inner chamber to the remote chamber, and an unlocked state for permitting the flow of the damping fluid from the inner chamber to the remote chamber. In the locked state, the movement of the articulating arm may be substantially transferred through the anti-roll bar link to the anti-roll bar, and in the unlocked state, the movement of the articulating arm may cause the piston to travel within the inner chamber such that at least a portion of the movement of the articulating arm is not transferred to the anti-roll bar.

In accordance with any of the embodiments disclosed herein, the valve may be configured to transition between the locked state and the unlocked state by mechanical manipulation of the valve.

In accordance with any of the embodiments disclosed herein, the valve may be a spool valve rotatable between the locked state and the unlocked state to selectively permit damping fluid flow within the passageway.

In accordance with any of the embodiments disclosed herein, the valve may be configured to transition between the locked state and the unlocked state in response to an electronic signal received by the valve.

In accordance with any of the embodiments disclosed herein, the valve may be a solenoid valve configured to selectively apply a magnetic force to a plunger slidable between a first position in the locked state and a second position in the unlocked state to selectively permit damping fluid flow within the passageway.

In accordance with any of the embodiments disclosed herein, the anti-roll bar link may further include a plunger spring that applies a biasing force to the plunger in a direction away from the second position toward the first position, wherein the biasing force may be less than the magnetic force.

In accordance with any of the embodiments disclosed herein, the anti-roll bar link may further include a floating piston slidingly disposed in the remote chamber, the floating piston sealingly partitioning the remote chamber into a first portion in fluid communication with the inner chamber by the passageway, and a second portion configured to retain a pressurized gas for applying a restoring force to the floating piston toward the first portion, urging the damping fluid in the first portion to return to the inner chamber.

In accordance with any of the embodiments disclosed herein, the anti-roll bar link may further include a damping component positioned between the inner chamber and the remote chamber to throttle the flow from the inner chamber to the remote chamber.

In accordance with any of the embodiments disclosed herein, the anti-roll bar link may further include a reflow passageway bypassing the valve and fluidly coupling the inner chamber and the remote chamber, and a check valve selectively controlling flow of the damping fluid through the reflow passageway by permitting flow only in a direction from the remote chamber to the inner chamber during retraction of the anti-roll bar link toward a parked position.

In accordance with any of the embodiments disclosed herein, the anti-roll bar link may further include a distal mount fixedly coupled to a distal end of the shaft and a proximal mount couplable to an intermediate axial position on the elongate body.

In accordance with any of the embodiments disclosed herein, the elongate body may further include a plurality of circumferential indentations corresponding to axial positions of the proximal mount on the elongate body, and wherein the proximal mount may be configured to interface with at least one of the plurality of circumferential indentations to axially fix the proximal mount with respect to the elongate body.

In accordance with another embodiment of the present technology, an anti-roll bar system for a vehicle suspension is provided. The anti-roll bar system generally includes an anti-roll bar and anti-roll bar links each coupled to the anti-roll bar and a respective articulating arm of the vehicle suspension. Each anti-roll bar link can include one or more hydraulic piston assemblies. In a fixed or locked state, the hydraulic piston assembly has a fixed length. In an unlocked state, the hydraulic piston assembly can extend to limit the amount of movement of the respective articulating arm transferred to the anti-roll bar. The hydraulic piston assembly can have one or more fluid control elements (e.g., valves, fluid pressurizing devices, remote reservoirs, etc) configured to selectively control the flow of fluid within the hydraulic piston assembly.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

Many aspects of the present technology can be better understood with reference to the following drawings. The components in the drawings are not necessarily drawn to scale. Instead, emphasis is placed on illustrating clearly the principles of the present technology. Furthermore, components can be shown as transparent in certain views for clarity of illustration only and not to indicate that the component is necessarily transparent. Components may also be shown schematically.

FIGS. 6A, 6B and 6C are enlarged cross-sectional detail views of the hydraulic anti-roll bar link of FIG. 2, showing representative flow paths during operation of the hydraulic anti-roll bar link.

DETAILED DESCRIPTION

The detailed description set forth below in connection with the appended drawings, where like numerals reference like elements, are intended as a description of various embodiments of the present technology and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

The following description provides several examples that relate to anti-roll bar configurations used in automotive suspensions. The embodiments of the anti-roll bar link described herein generally include features to provide selectable, damped relative motion between the anti-roll bar and the vehicle suspension. Damping of the relative motion between the anti-roll bar the vehicle suspension can provide roll stability to the vehicle during operation with the anti-roll bar links in an unlocked state. Unlocking the anti-roll bar links can provide the aforementioned advantages of a substantially disconnected anti-roll bar, by increased articulation of the suspension during off-road and other uses, while decreasing the tendency of the vehicle to become unstable in side-to-side motion during operation. In some embodiments, the anti-roll bar link of the present technology is configured for use with original equipment anti-roll bars, such that a user can install and gain the advantages of the anti-roll bar links without replacing various other suspension or anti-roll bar system components. As will be explained in greater detail below, the anti-roll bar link includes adjustability in the mounting features to adapt the link to different vehicle's suspension configurations.

Embodiments of the anti-roll bar link include: (1) a locked state, where the link is substantially rigid and does not allow relative movement between the anti-roll bar and the suspension components; and (2) an unlocked state, where the link is configured to readily extend and retract to allow damped relative movement between the anti-roll bar and the suspension components. The anti-roll bar link may include a manual toggle switch used to transition the link between the locked state and the unlocked state, e.g., a lever, switch, etc. configured for manipulation by a user of the link. In other embodiments, the anti-roll bar link may include an automated feature to transition the link between the locked stated the unlocked state, e.g., an electronic or pneumatic actuator (e.g., the anti-roll bar link of FIGS. 7A and 7B), or other suitable toggling system.

Figure 1:
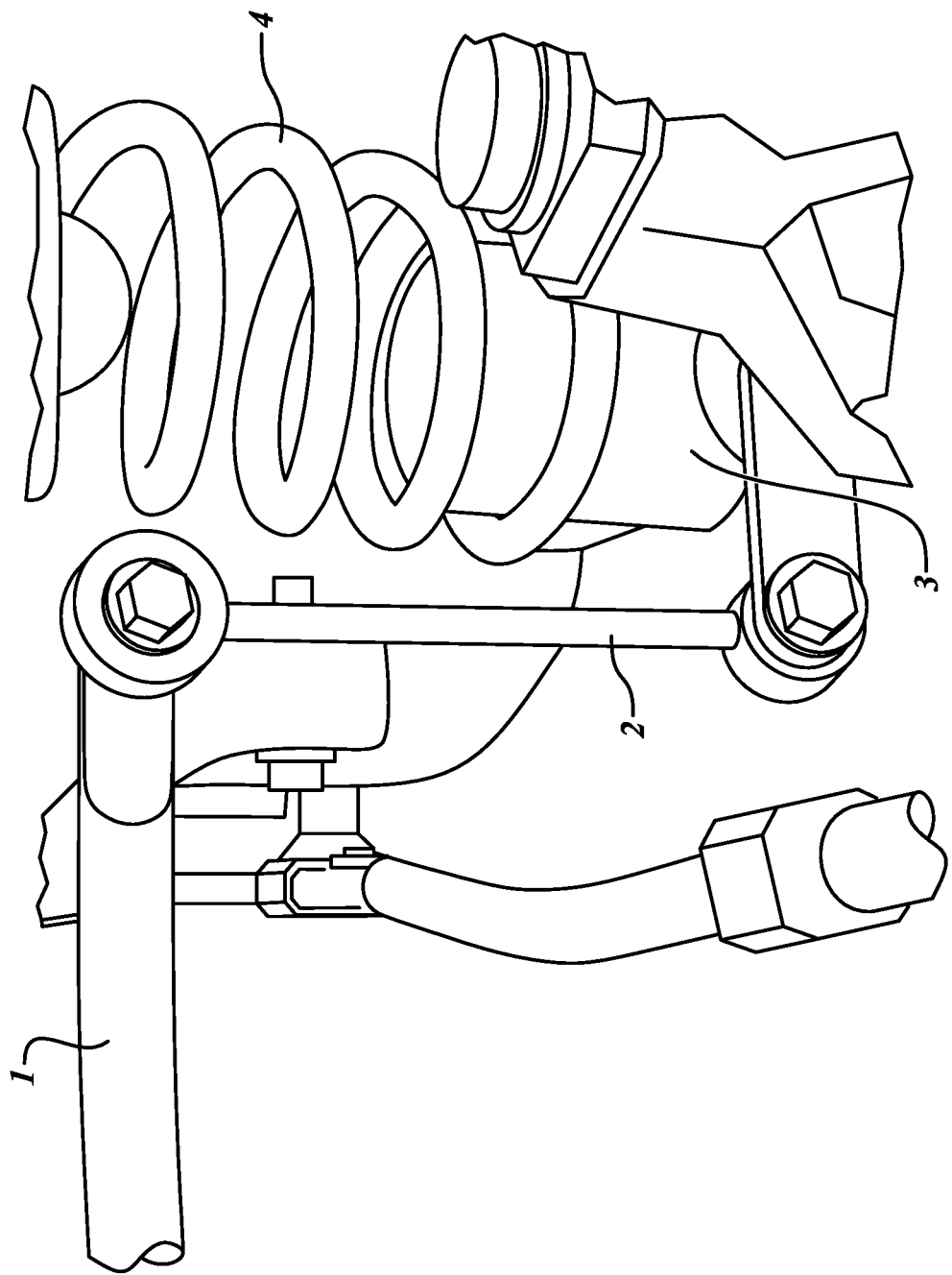
FIG. 1 is an environmental view of an anti-roll bar system configured in accordance with existing technology.
Figure 2:
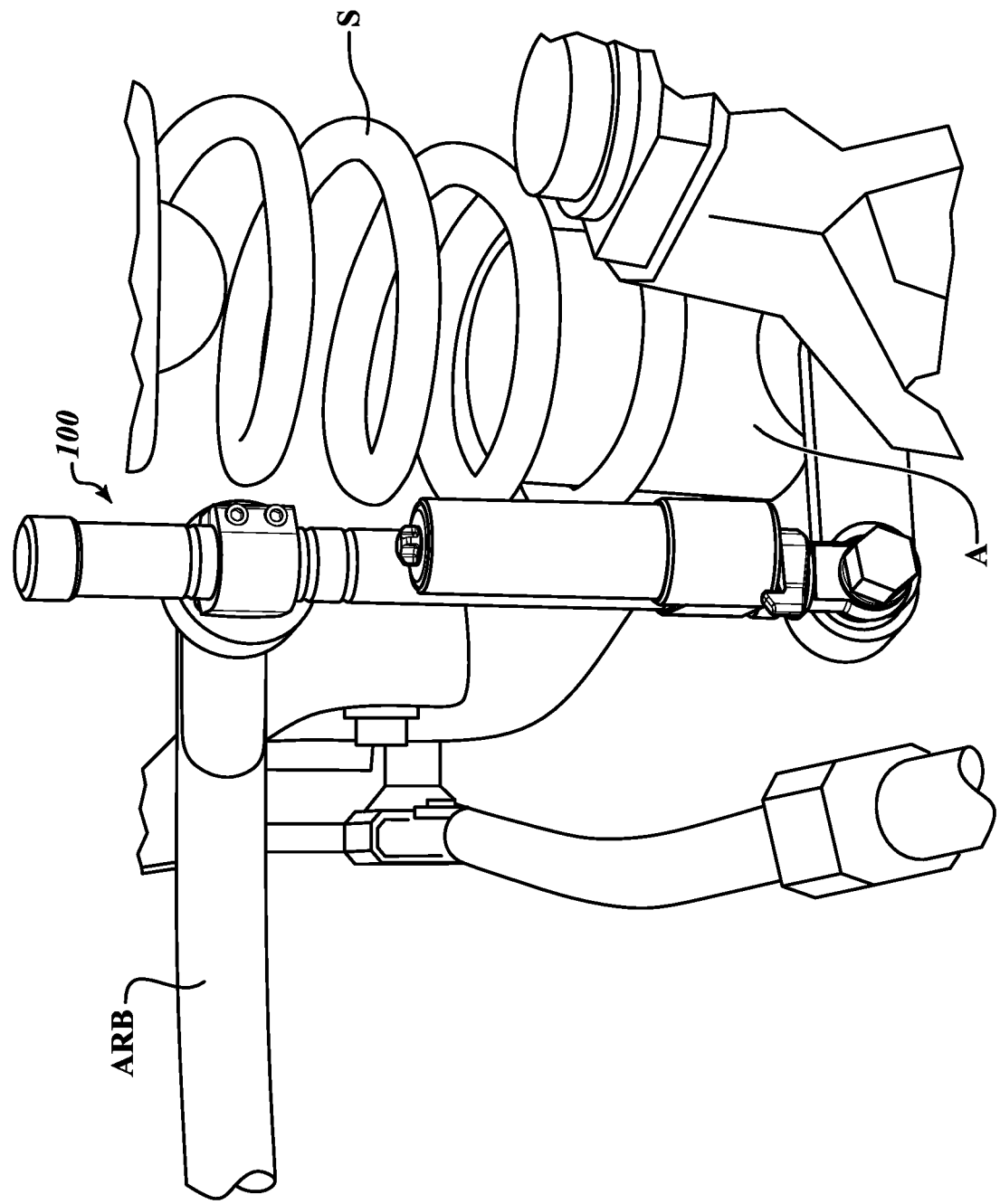
FIG. 2 is an environmental view of an anti-roll bar system having a hydraulic anti-roll bar link configured in accordance with an embodiment of the present technology.

FIG. 2 is an environmental view of an anti-roll bar assembly having a hydraulic anti-roll bar link 100 connected between an anti-roll bar ARB and an axle or control arm A of a vehicle suspension. The suspension generally includes a spring S to provide counter-resistance to input compression forces. Although FIG. 2 shows the anti-roll bar link 100 in one orientation with the toggle switch nearer the axle A, in other embodiments, the anti-roll bar link 100 is configured for use in the opposite orientation, with the toggle switch nearer the anti-roll bar ARB. The configuration of the link 100 can be selected based on the configuration of the suspension system (e.g., for user access to the toggle switch, suspension geometry, damage protection, corrosion, etc).

Figure 3:
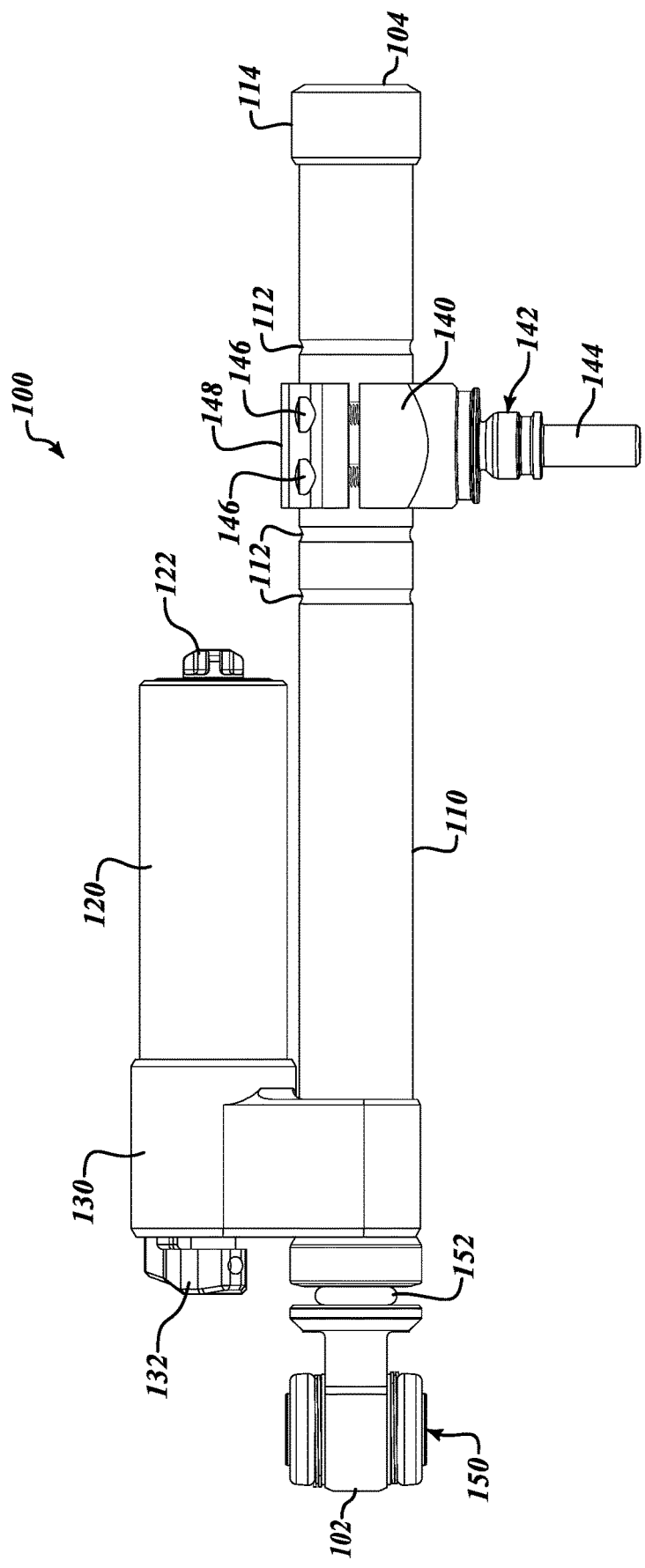
FIG. 3 is a right-side elevation view of the anti-roll bar link of FIG. 2.

FIG. 3 shows a right-side elevation view of an embodiment of the anti-roll bar link 100, having a distal end 102, a proximal end 104, a body 110, and a remote reservoir 120. The body 110 may include one or more circumferential indentations, or positioning features 112, configured to interface with fasteners 146 of a proximal mount 140 to lock the axial location of the proximal mount 140 with respect to the body 110. When the proximal mount 140 is assembled to the body 110, a clamping three locks the radial position of the proximal mount 140 with respect to the body 110 and the fasteners 146 are positioned within the positioning features 112 to provide a mechanical interference retaining the axial position of the proximal mount 140 in instances where the fasteners 146 are inadvertently loosened but remain in position. In other embodiments, the proximal mount 140 is coupled to the body 110 using any suitable coupling, such as by welding, adhesive, press-fit, etc.

The proximal mount 140 may include a ball joint assembly 142 to provide positional articulation of a mounting stud 144 for mounting the proximal mount 140 to a component of the anti-roll bar assembly (e.g., the anti-roll bar ARB, the axle A, etc.), and for accommodating suspension articulation. Other mounting configurations besides the mounting stud 144 are within the scope of the present technology. In some embodiments, the proximal mount 140 has a clamshell configuration and includes an opposable mounting cap 148. The proximal mount 140 may be formed from a single piece configured for installation on the body 110, for example, prior to installing a proximal end cap 114 on the body 110. In other embodiments, the proximal mount is located at the proximal end 104, and can be any suitable mount, such as a mounting bushing, a spherical eyelet, a mounting stud, etc. In these embodiments, the proximal mount 140 is omitted, and the proximal end 104 of the anti-roll bar link 100 is coupled to the vehicle suspension using such mounts.

The distal end 102 of the body 110 may include a mounting bushing assembly 150 coupled to the end of a damper shaft 116 (FIG. 4A) for mounting the other end of the link 100 to another component of the anti-roll bar assembly (e.g., the other of the anti-roll bar ARB, the axle A, etc., opposite the mounting stud 144). Although the distal end 102 is shown with a mounting bushing assembly 150, in other embodiments, any suitable mounting configuration is within the scope of the present technology, e.g., a spherical eyelet, a mounting stud, etc. In some embodiments, an elastomeric bumper 152 is positioned between the mounting bushing assembly 150 at the distal end 102 and the body 110 to prevent impact of components of the link 100 during use. In this regard, the elastomeric bumper 152 may reduce noise (e.g., clicking, creaking, squeaking, etc.) during operation of the vehicle.

A remote reservoir carrier 130 may be positioned at the distal end of the body 110 to mount and fluidly couple the remote reservoir 120 and an inner chamber 106 (FIG. 4A) defined by a central bore of the body 110. As shown, the distal end of the remote reservoir 120 may include a valve 122 configured for filling internal portions of the remote reservoir 120 with gas or damping fluid. The distal end of the remote reservoir 120 may include a toggle switch 132 configured to toggle the link 100 between locked and unlocked states. The illustrated embodiment shows one possible configuration of the remote reservoir 120; however, and other embodiments, the remote reservoir may be fluidly coupled to the inner chamber 106 using a conduit (e.g., a flexible hose), or other suitable fluid connection. In further embodiments, the toggle switch 132 may be coupled to the body 110 or other location in the fluid connection between the body 110 and the remote reservoir 120. As described above, automated toggling between the locked and unlocked states is also within the scope of the present technology, and may be actuated using any known method.

Figure 4A:
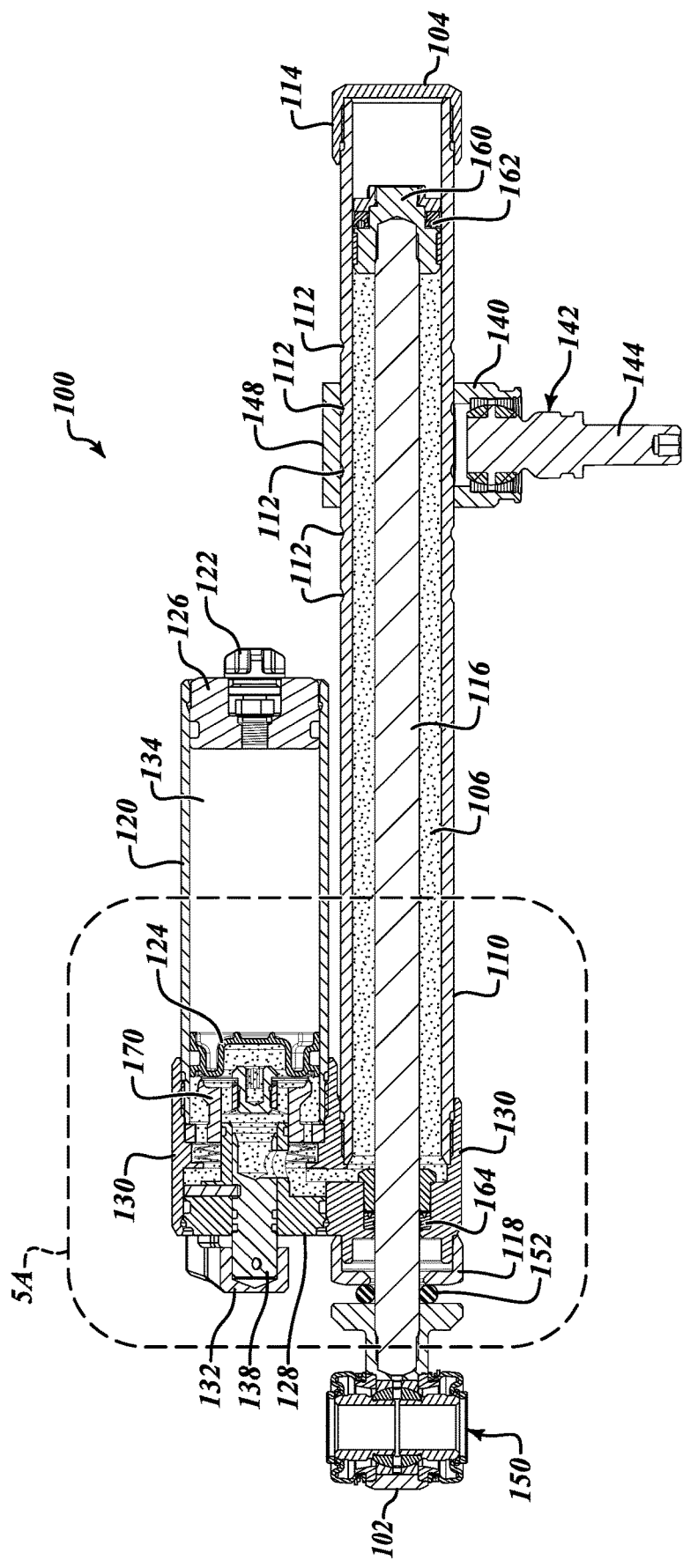
FIG. 4A is a cross-sectional right-side elevation view of the hydraulic anti-roll bar link of FIG. 2, showing the link in a parked position.
Figure 4B:
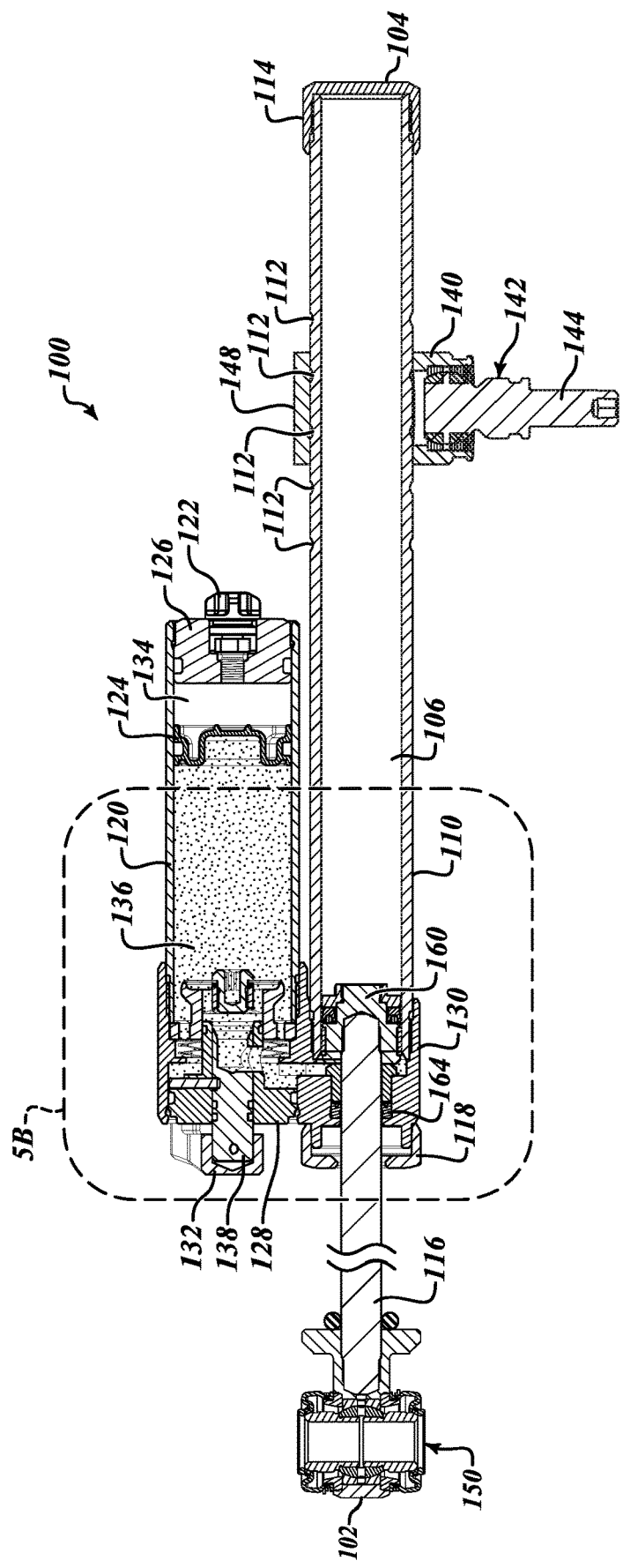
FIG. 4B is a cross-sectional right-side elevation view of the hydraulic anti-roll bar link of FIG. 2, showing the link in an extended position.

FIGS. 4A and 4B show cross-sectional right-side elevation views of the anti-roll bar link 100 of the present technology in a parked position (FIG. 4A) and a fully extended position (FIG. 4B). As shown, a damper shaft 116 is positioned to axially travel within the inner chamber 106. The proximal end of the damper shaft 116 includes a fixed piston 160 having a chamber wall seal 162 configured to prevent damping fluid within the inner chamber 106 from flowing past the fixed piston 160 and reaching the proximal cap 114. In some configurations, the portion of the inner chamber 106 positioned between the fixed piston 160 and the proximal cap 114 is filled with low-pressure gas (e.g., air) as to not impede parking of the link 100 (a position with the damper shaft 116 fully retracted). To ensure return to the parking position of the link 100 is not impeded, the proximal cap 114 may be vented to the atmosphere to prevent an increase in pressure in the portion of the inner chamber 106 between the fixed piston 160 and the proximal cap 114. The distal end of the damper shaft 116 may be coupled to the mounting bushing assembly 150 using threads or other suitable mechanical coupling features. In an unlocked state of the link 100, the damper shaft 116 travels in and out of the inner cavity 106 through an aperture in a distal cap 118 during articulation of the vehicle suspension. A shaft seal 164 may be positioned between the distal cap 118 and the inner chamber 106 to prevent leakage of damping fluid at the distal end of the body 110.

The remote reservoir 120 includes a floating piston 124 slidingly positioned within a remote chamber 134 for separating damping fluid from gas within the remote reservoir 120. The distal end of the remote reservoir 120 may include a distal plug 126 to prevent leakage of the gas from the remote reservoir 120. As described above, the distal plug 126 may include the valve 122 to add or remove the gas from the remote chamber 134. During extension of the link 100, damping fluid enters the remote chamber 134 from the distal end and causes the floating piston 124 to travel toward the proximal end of the remote chamber 134, toward the position of the floating piston 124 shown in FIG. 4B, which shows damping fluid 136 filling a portion of the remote chamber 134 between the floating piston 124 and a valve housing 170.

The distal end of the remote reservoir 120 may include a distal plug 128 to prevent leakage of the gas or damping fluid from the remote reservoir 120. A spool valve 138 may be positioned to extend through the distal plug 128 to provide selectable fluid flow between the inner chamber 106 and the remote chamber 134. The spool valve 138 may be configured such that rotation of the spool valve 138 selectively fluidly couples passageways between the inner chamber 106 and the remote chamber 134. One embodiment of such passageway configurations will be explained in greater detail below; however, any passageway configuration between the inner chamber 106 and the remote chamber 134 is within the scope of the present technology. As described above, the spool valve 138 may be transitioned between a position for the unlocked state of the link 100 to a position for the locked state of the link 100. The transition of the spool valve 138 can be initiated using a toggle switch 132 or other suitable mechanical manipulation. In other embodiments, the spool valve 138 is transitioned between unlocked and locked positions using any suitable mechanical or automated configuration.

Figure 5A:
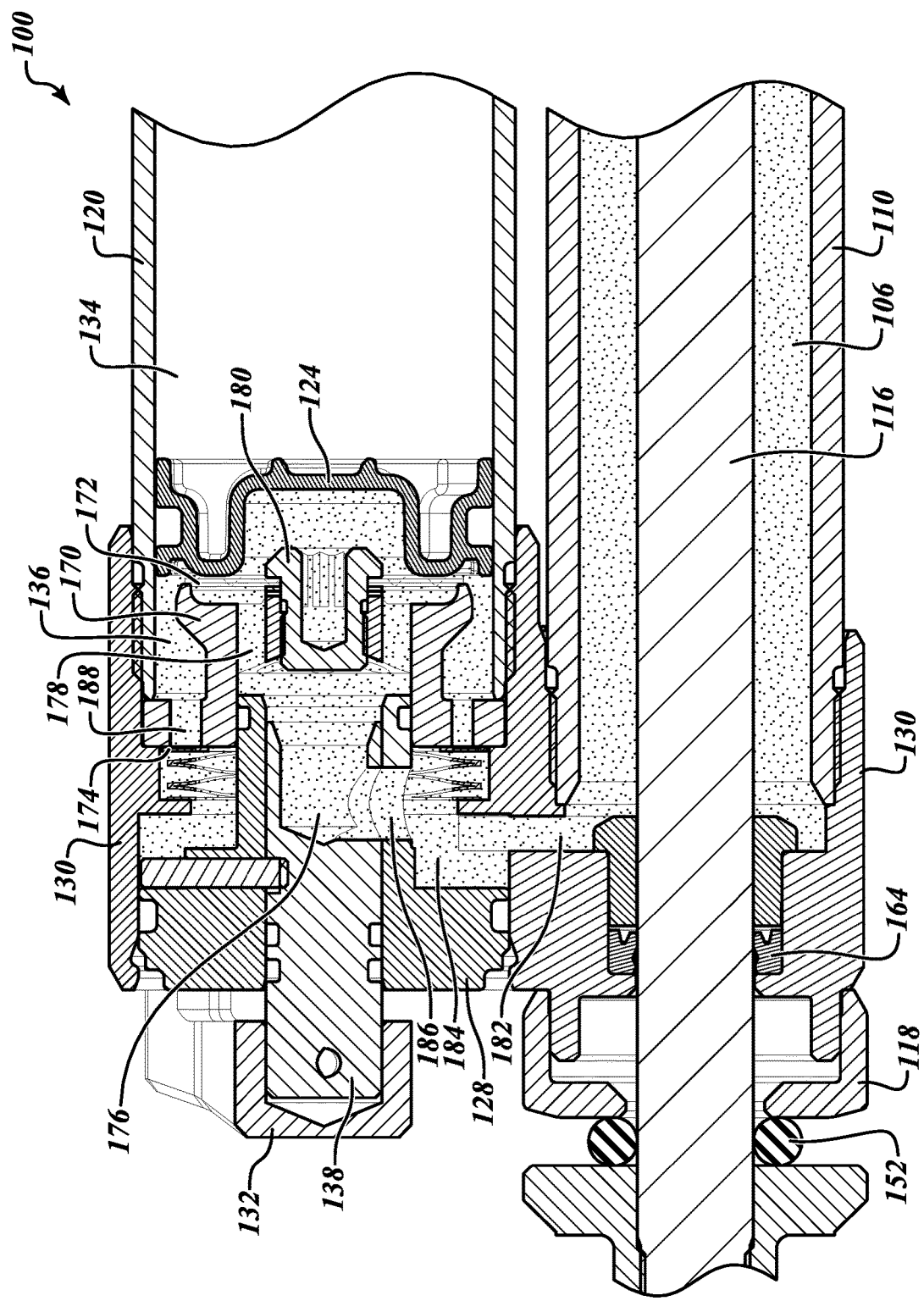
FIG. 5A is an enlarged cross-sectional detail view of the hydraulic anti-roll bar link of FIG. 2, within the detail view boundary shown in FIG. 4A.
Figure 5B:
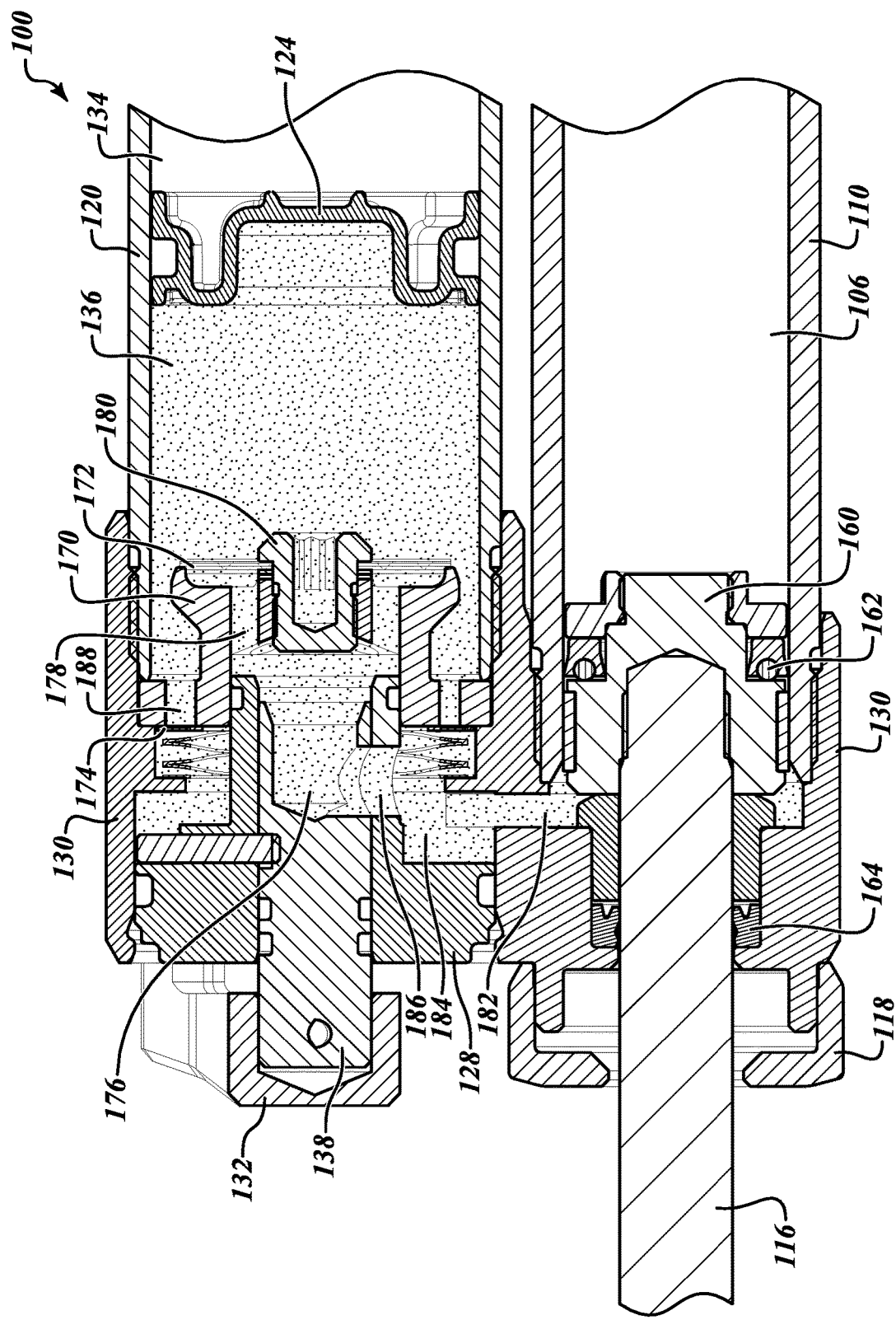
FIG. 5B is an enlarged cross-sectional detail view of the hydraulic anti-roll bar link of FIG. 2, within the detail view boundary shown in FIG. 4B.

FIGS. 5A and 5B show enlarged cross-sectional detail views of the anti-roll bar link 100, where designated in FIGS. 4A and 4B. In this regard, FIG. 5A shows the link 100 in the parked position, such as when the link 100 is in the locked state, and FIG. 5B shows the link 100 in an extended position, such as when the link 100 is in the unlocked state and the suspension of the vehicle is articulated. As best seen in FIG. 5A, various passageways fluidly couple the inner chamber 106 and the remote chamber 134. A first passageway 182 is in fluid communication with the inner chamber 106 and positioned at the distal end of the body 110 within the reservoir carrier 130. The first passageway 182 is also in fluid communication with a second passageway 184, defined by internal surfaces of the distal plug 128 and the reservoir carrier 130. The second passageway 184 is radially positioned around the distal plug 128, and the second passageway 184 is also in fluid communication with a third passageway 186 positioned adjacent to the spool valve 138. The third passageway 186 is also in selective fluid communication with an internal spool chamber 176 of the spool valve 138.

The proximal end of the internal spool chamber 176 may outlet into a plurality of valve passages 178 extending through the valve housing 170. A shim stack 172 may be coupled to the outlet of the valve housing 170 to provide a damped or throttled flow of the damping fluid through the valve housing 170. As the damping fluid travels through the valve passages 178, the pressure of the damping fluid deflects the shim stack 172 away from the valve housing 172 to release the damping fluid 136 into the remote chamber 134. In some embodiments, the shim stack 172 may have a preload such that one or more shims in the shim stack 172 are in a deflected state when there is no fluid flow. In other embodiments, the shim stack 172 may have any suitable configuration to adjust the desired damping characteristics of the link 100, such as one or more bleed ports.

As the link 100 returns from an extended position (FIG. 5B) back to a parked position (FIG. 5A), damping fluid 136 within the remote chamber 134 necessarily returns to the inner chamber 106 through reflow passages 188 extending through the valve housing 170 as the shim stack 172 prevents reflow through the valve passages 178. A check valve 174 may be positioned at the distal end of the reflow passages 188 to prevent damping fluid 136 from traveling in a direction toward the remote chamber 134 during extension of the link 100. However, during retraction of the link 100 to the parked position, damping fluid pressure compresses the check valve 174 and allows flow of the damping fluid 136 through the reflow passages 188, into the second passageway 184, the first passageway 182, and back into the inner chamber 106. In some embodiments, the first and second passageways 182 and 184 are formed as a single passageway. As noted herein, the separation of the first and second passageways 182 and 184 is for illustrative purposes only and should not be construed as limiting the present technology. In other embodiments, the passages are configured in any suitable arrangement, and may include fewer or greater than the illustrated embodiment. Such arrangements are also within the scope of the present technology.

Figure 6A:
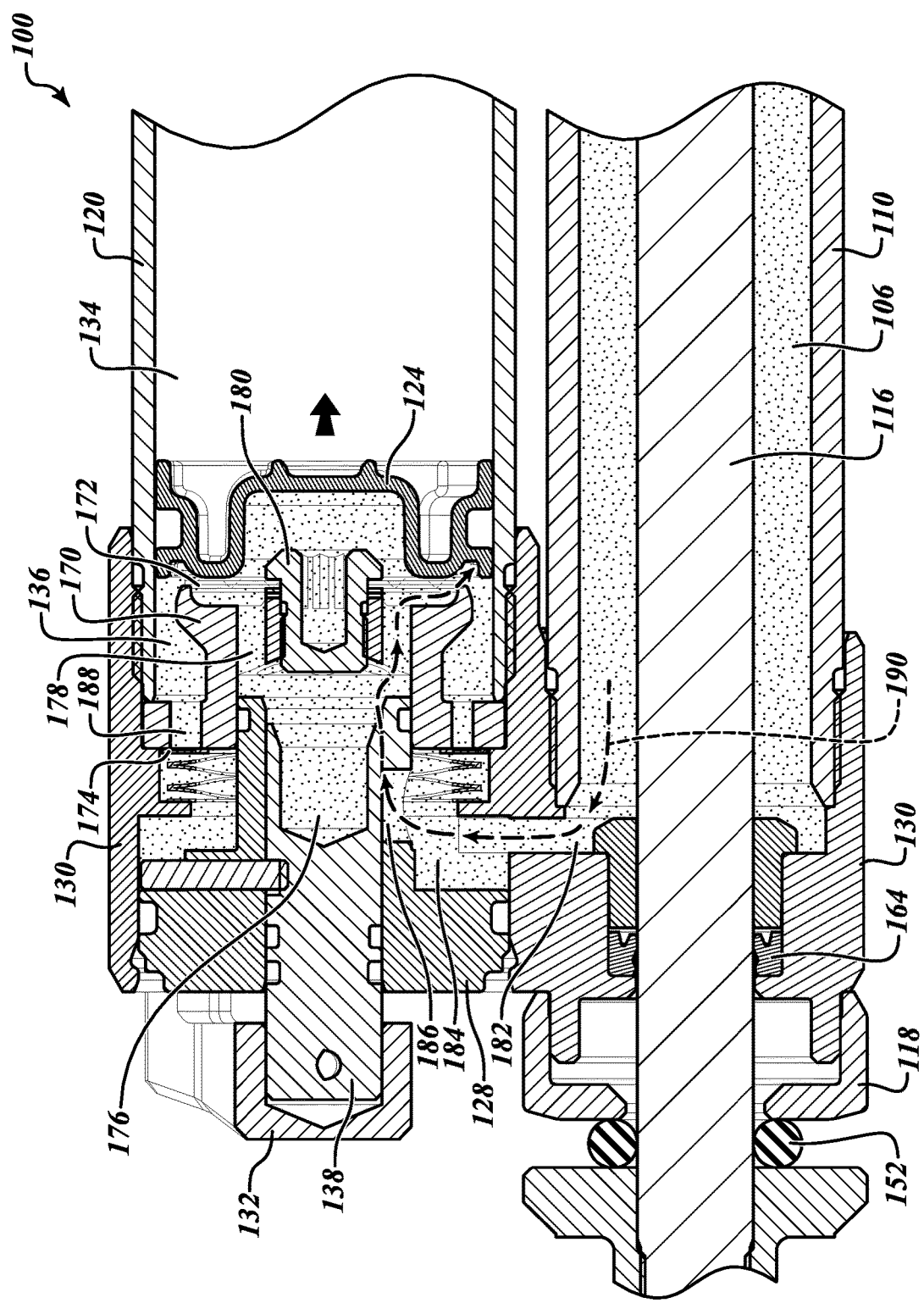
Figure 6B:
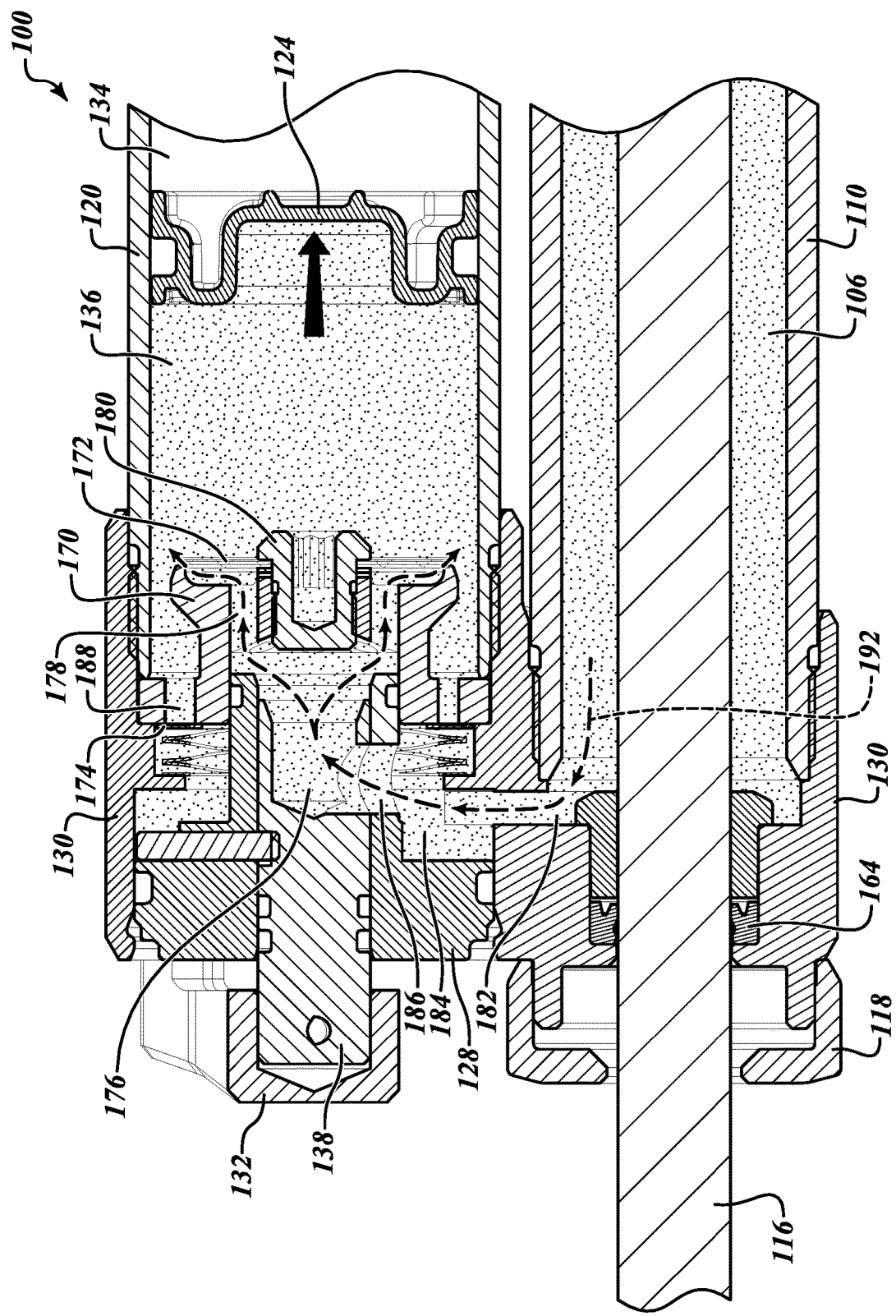

FIGS. 6A-6C show enlarged cross-sectional detail views of the anti-roll bar link 100 in the configurations shown in FIGS. 5A and 5B, depicting various flow paths of the damping fluid during use of the link 100. FIG. 6A shows a damping fluid bleed through (micro leak) flow path for thermal accommodation under locked tension (extension) load. FIG. 6B shows a damped flow path of damping fluid under unlocked tension load. FIG. 6C shows a reflow path of damping fluid as the link 100 returns to the parked state.

Turning to FIG. 6A, in some embodiments, the tolerances of the spool valve 138 are configured to allow a relatively small amount of bleed through of damping fluid between the outer surface of the spool valve 138 and inner surface of the distal plug 128 when the spool valve 138 is in the locked radial position. Such bleed through is configured to allow for thermal expansion within the link 100 in the locked state to prevent elevated burst pressures from causing damage or failure of the link 100 during use. The bleed through flow path 190 shows a path of damping fluid travel from the inner chamber 106, through the first passageway 182, the second passageway 184, the third passageway 186, the valve passages 178, and past the shim stack 172 into the remote chamber 134. The bleed through flow path 190 allows a minimal amount of damping fluid flow during thermal expansion when the link 100 is in the locked state and the link 100 experiences a tension load based on suspension articulation of the vehicle.

FIG. 6B shows the damped flow path of the damping fluid under unlocked tension load of the link 100. The extension flow path 192 shows a path of damping fluid travel from the inner chamber 106, through the first passageway 182, the second passageway 184, the third passageway 186, the internal spool chamber 176, the valve passages 178, past the shim stack 172, and into the remote chamber 134. As shown, when the spool valve 138 is rotated to the unlocked position, an inlet of the internal spool chamber 176 aligns with the third passageway 186 and provides a fluid connection therebetween. As the damping fluid flows into the remote chamber 134, the floating piston 124 translates toward the proximal end of the remote reservoir 120.

FIG. 6C shows the reflow path of the damping fluid as the link 100 returns to the parked position, such as after locking the spool valve 138, or when the suspension of the vehicle reverses the direction of articulation. The reflow path 194 shows a path of damping fluid travel from the remote chamber 134, through the reflow passages 188, compressing the check valve 174, through the second passageway 184 and the first passageway 182, and into the inner chamber 106. In some embodiments, gas pressure on the proximal side of the floating piston 124 translates the floating piston 124 toward the distal end of the remote reservoir 120 and urges the damping fluid along the reflow path 194 as the link 100 returns toward the parked position. In other embodiments, a spring or other component is configured to translate the floating piston 124 toward the distal end of the remote reservoir 120.

Figure 7A:
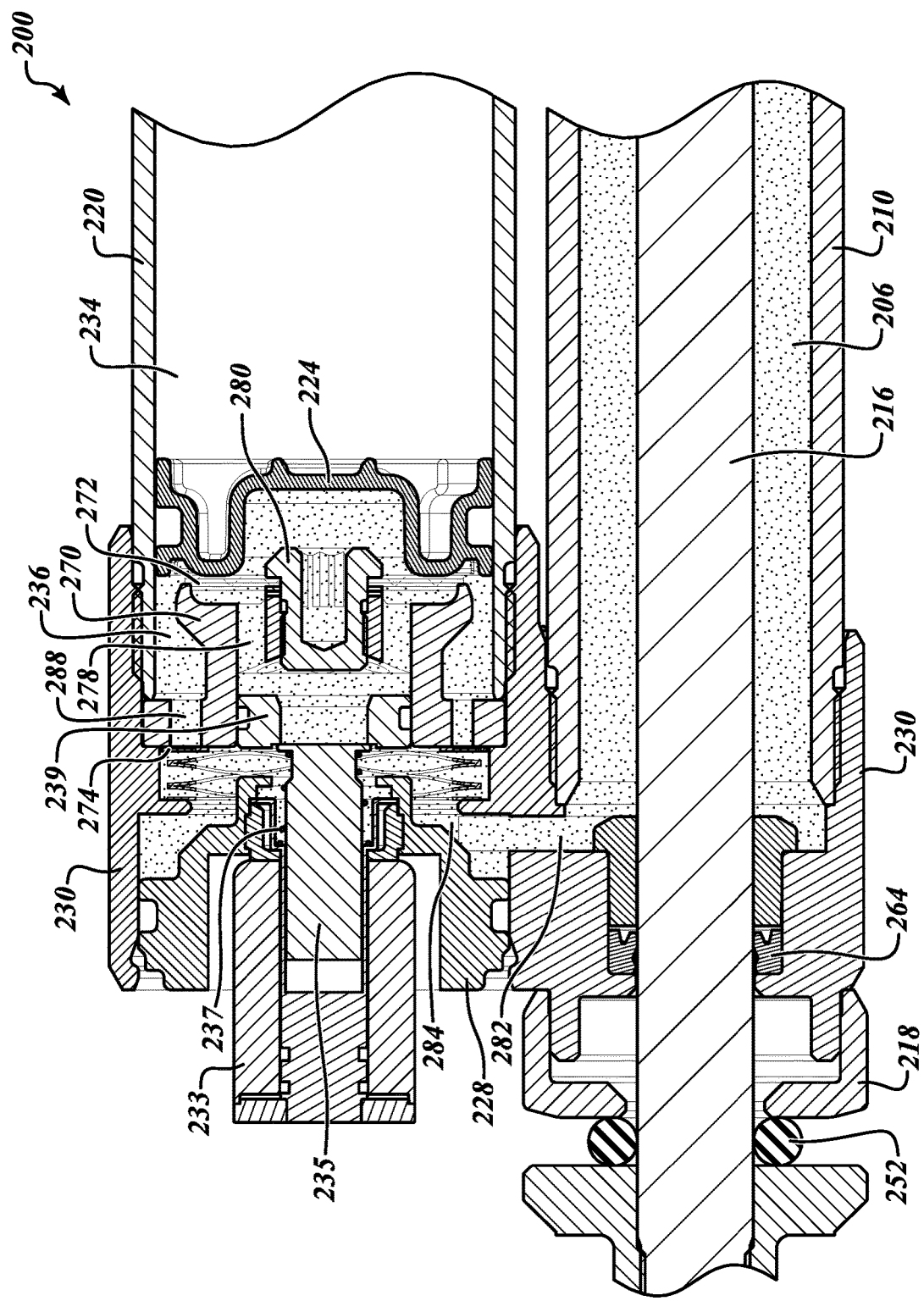
FIG. 7A is an enlarged cross-sectional detail view of an anti-roll bar link configured in accordance with another embodiment of the present technology.
Figure 7B:
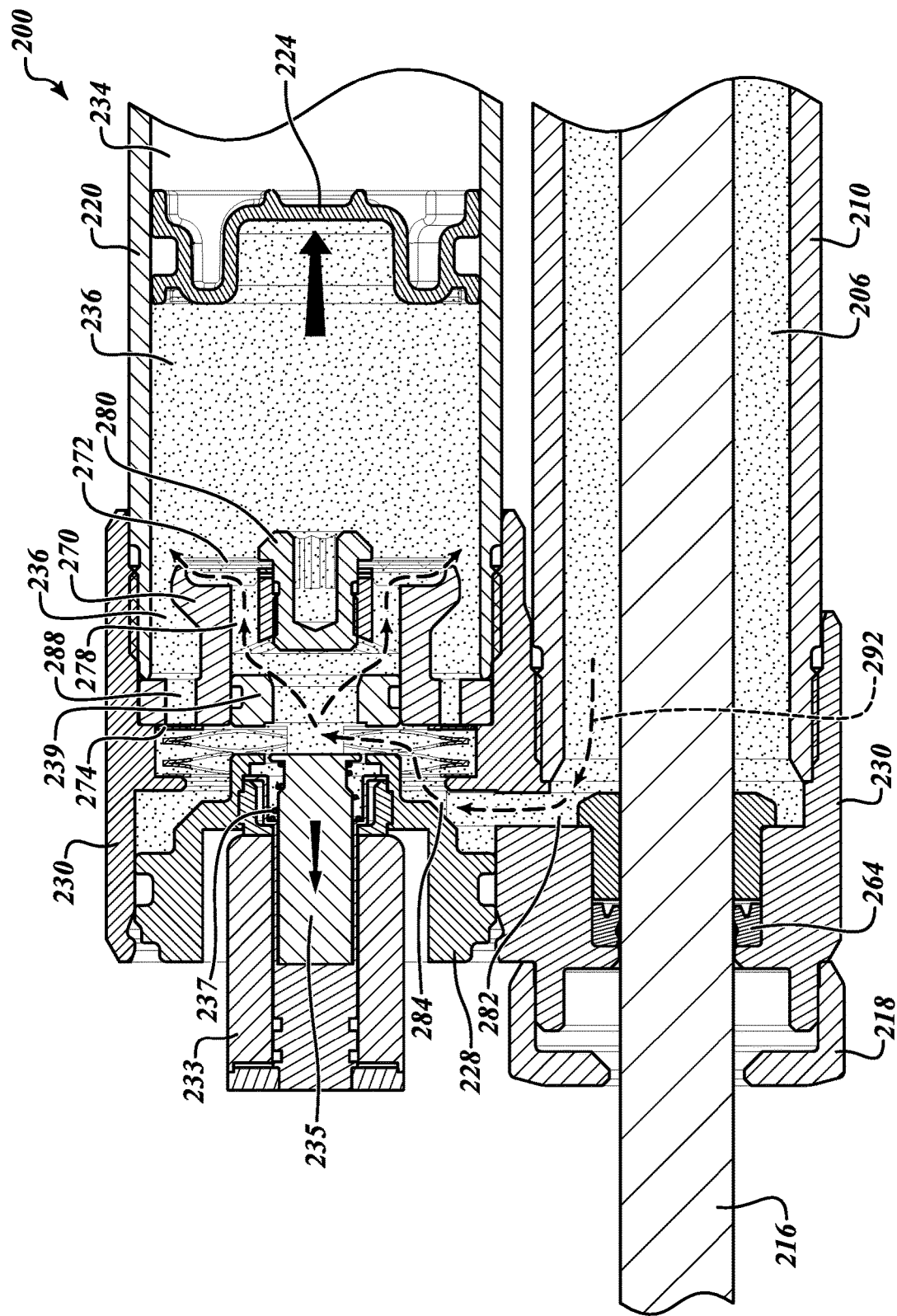
FIG. 7B is an enlarged cross-sectional detail views of the hydraulic anti-roll bar link of FIG. 7A, showing a representative flow path during operation of the hydraulic anti-roll bar link.

FIGS. 7A and 7B show enlarged cross-sectional detail views of an anti-roll bar link 200 in accordance with another embodiment of the present technology. Certain components of the anti-roll bar link 200 are similar to components of the hydraulic anti-roll bar link 100. The similar components have like reference numerals, except are denoted in the 200-series instead of the 100-series, unless otherwise noted. In this regard, certain components of the anti-roll bar link 200 are not reintroduced for clarity in the ensuing description.

The anti-roll bar link 200 has various components substantially similar to the hydraulic anti-roll bar link 100; however, the anti-roll bar link 200 is configured to operate electronically (e.g., by energizing and deenergizing an electric solenoid), as opposed to the manual spool valve 138 operation of the hydraulic anti-roll bar link 100. In this regard, in the anti-roll bar link 200, the toggle switch 132 and the spool valve 138 are generally replaced with a solenoid valve 233 having a plunger 235 configured to transition the anti-roll bar link 200 between a locked position (FIG. 7A) and an unlocked position (FIG. 7B), where the plunger 235 is configured to seat against a sealing ring 239 positioned between the plunger 235 and the valve housing 270. FIG. 7A shows an enlarged cross-sectional detail view the anti-roll bar link 200 in a similar configuration as FIG. 5A. FIG. 7B shows an enlarged cross-sectional detail view of the anti-roll bar link 200 and a similar configuration as FIG. 6B, showing a low path 292 of damping fluid 236. In other embodiments, a stepper motor, a pull cable, an air cylinder, etc, is used to transition the anti-roll bar link between a locked position and an unlocked position.

As shown in FIG. 7A, in the locked state, the damping fluid 236 is restricted from flowing between the inner chamber 206 and the remote chamber 234 by the seating of the plunger 235 against the sealing ring 239. In some embodiments, a small amount of damping fluid 236 is still allowed to bleed between the inner chamber 206 and the remote chamber 234 through a similar path as shown in FIG. 6A. For brevity, a bleed path 290 is not shown for the anti-roll bar link 200. As with the flow and FIG. 6A, such bleed flow will also be damped by a shim stack 272.

The plunger 235 is in the locked position when the solenoid valve 233 is not energized. In this position, a plunger spring 237 biases the plunger 235 to the seated position against the sealing ring 239. If the damper shaft 216 is in an extended position when the solenoid valve 233 is deenergized, the plunger 235 can act as a check valve allowing damping fluid 236 to compress the plunger spring 237 and flow back into the inner chamber 206 to return the anti-roll bar link 200 to the parked position, but preventing flow toward the remote chamber 234. Once the anti-roll bar link 200 returns to the parked position, the plunger 235 will seat against the sealing ring 239 as a result of the plunger spring 237, and damping fluid 236 will be prevented from flowing past the plunger 235 into the remote chamber 234, effectively locking the anti-roll bar link 200 into the parked position.

FIG. 7B shows the unlocked state where the solenoid valve 233 is energized, retracting the plunger 235, and allow the damping fluid 236 to flow between the inner chamber 206 and the remote chamber 234 along an extension flow path 292. When the anti-roll bar link 200 is unlocked, the solenoid valve 233 is energized and provides a magnetic retraction force to the plunger 235. During this transition, the plunger spring 237 counteracts, but is overcome by the magnetic retraction force applied by the solenoid valve 233. As described above with respect to the anti-roll bar link 100, the return flow path of the anti-roll bar link 200 is similar to the flow path 194 shown in FIG. 6C.

In some embodiments, the magnetic retraction force of the solenoid valve 233 is configured such that the plunger 235 will not retract to the unlocked position until the pressures within the inner chamber 206 and the remote chamber 234 are substantially similar. This pressure equalization generally occurs when the anti-roll bar ARB is unloaded. When the anti-roll bar link 200 is in the parked position and the anti-roll bar ARB is loaded, the torque from the anti-roll bar ARB imparts a force on the anti-roll bar link 200 which elevates the pressure of the damping fluid 236 in the inner chamber 206. The elevated pressure of the damping fluid 236 applies a closing force on the plunger 235 (in conjunction with the plunger spring 237) to maintain the plunger in the closed position against the sealing ring 239 until the anti-roll bar ARB is unloaded and lowers the pressure of the damping fluid 236 within the inner chamber 206. Once the pressure of the damping fluid 236 within the inner chamber 206 is substantially equalized with the pressure of the damping fluid 236 in the remote chamber 234, the solenoid valve 233 will overcome the plunger spring 237 and retract the plunger 235 with the magnetic retraction force. Such operation imparts a safety feature into the anti-roll bar link 200 by disallowing the anti-roll bar link 200 to transition from the parked position to an unlocked state while the anti-roll bar ARB is loaded, such as when the vehicle is cornering. Without such a safety feature, unlocking the anti-roll bar link 200 could upset the balance of the vehicle during operation and/or cause the operator to lose control of the vehicle.

The anti-roll bar link 200 may include a manual toggle feature, e.g., a button, allowing the user to control the state of the anti-roll bar link, and/or an automated feature toggled by a controller. In such hybrid configurations, the manual feature may override the automated feature, or the automated feature may override the manual feature, e.g., automatically locking the anti-roll bar link when the vehicle reaches a certain speed threshold. The state of the link may be safely transitioned at any articulation level of the vehicle suspension due to the pressure equalization safety feature described above.

In the foregoing description, specific details are set forth to provide a thorough understanding of exemplary embodiments of the present technology. It should be apparent to one skilled in the art, however, that the embodiments disclosed herein may be practiced without embodying all of the specific details. In some instances, well-known process steps have not been described in detail in order not to unnecessarily obscure various aspects of the present technology. Further, it should be appreciated that embodiments of the present technology may employ any combination of features described herein. Moreover, the various embodiments described herein may also be combined to provide further embodiments. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment.

The present application may include references to directions, such as "forward," "rearward," "front," "rear," "upward," "downward," "top," "bottom," "right hand," "left hand," "proximal," "distal," "in," "out," "extended," etc. The reference terms "proximal" and "distal" are intended to generally relate to the position of the anti-roll bar link in the orientation shown in FIG. 2, where the lower end, having the toggle switch and remote reservoir, would typically be physically farther from the driver of the vehicle; however, in other orientations within the scope of the present technology, the distal end may be closer to the driver than the proximal end. These references, and other similar references in the present application, are only to assist in helping describe and to understand the particular embodiment and are not intended to limit the present technology to these directions or locations. The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number, and is meant to be any number that is more than one, for example, two, three, four, five, etc.

For ease of reference, identical reference numbers are used to identify similar or analogous components or features throughout this disclosure, but the use of the same reference number does not imply that the features should be construed to be identical. Indeed, in many examples described herein, identically numbered features have a plurality of embodiments that are distinct in structure and/or function from each other. Furthermore, the same shading may be used to indicate materials in cross section that can be compositionally similar, but the use of the same shading does not imply that the materials should be construed to be identical unless specifically noted herein.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. Additionally, the term "comprising" is used throughout to mean including at least the recited feature(s) such that any greater number of the same feature and/or additional types of other features are not precluded. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. An anti-roll bar link for a vehicle suspension, the anti-roll bar link comprising:
   an elongate body having a central bore defining an inner chamber configured to retain a damping fluid, the elongate body having an aperture at a distal end of the body;
   a shaft extending through the aperture, the shaft having a piston fixed to a proximal end of the shaft and slidingly disposed within the inner chamber;
   a reservoir body enclosing a remote chamber fluidly coupled to the inner chamber through a passageway;
   a valve configured to selectively control flow of the damping fluid within the passageway, the valve positionable between a locked state for restricting the flow of the damping fluid from the inner chamber to the remote chamber, and an unlocked state for permitting the flow of the damping fluid from the inner chamber to the remote chamber;
   a reflow passageway bypassing the valve and fluidly coupling the inner chamber and the remote chamber; and
   a check valve selectively controlling flow of the damping fluid through the reflow passageway by permitting flow only in a direction from the remove chamber to the inner chamber during retraction of the anti-roll bar link toward a parked position.

2. The anti-roll bar link of claim 1, wherein the valve is configured to transition between the locked state and the unlocked state by mechanical manipulation of the valve.

3. The anti-roll bar link of claim 2, wherein the valve is a spool valve rotatable between the locked state and the unlocked state to selectively permit damping fluid flow within the passageway.

4. The anti-roll bar link of claim 1, wherein the valve is configured to transition between the locked state and the unlocked state in response to an electronic signal received by the valve.

5. The anti-roll bar link of claim 4, wherein the valve is a solenoid valve configured to selectively apply a magnetic force to a plunger slidable between a first position in the locked state and a second position in the unlocked state to selectively permit damping fluid flow within the passageway.

6. The anti-roll bar link of claim 5, further comprising a plunger spring that applies a biasing force to the plunger in a direction away from the second position toward the first position, wherein the biasing force is less than the magnetic force.

7. The anti-roll bar link of claim 1, further comprising a floating piston slidingly disposed in the remote chamber, the floating piston sealingly partitioning the remote chamber into a first portion in fluid communication with the inner chamber by the passageway, and a second portion configured to retain a pressurized gas for applying a restoring force to the floating piston toward the first portion, urging the damping fluid in the first portion to return to the inner chamber.

8. The anti-roll bar link of claim 1, further comprising a damping component positioned between the inner chamber and the remote chamber to throttle the flow from the inner chamber to the remote chamber.

9. The anti-roll bar link of claim 1, further comprising a distal mount fixedly coupled to a distal end of the shaft and a proximal mount couplable to an intermediate axial position on the elongate body.

10. The anti-roll bar link of claim 9, wherein the elongate body further comprises a plurality of circumferential indentations corresponding to axial positioning features of the proximal mount on the elongate body, and wherein the proximal mount is configured to interface with at least one of the plurality of circumferential indentations to axially fix the proximal mount with respect to the elongate body.

11. An anti-roll bar system for a vehicle suspension, the anti-roll bar system comprising:
an anti-roll bar; and
an anti-roll bar link coupled to the anti-roll bar to transfer movement of an articulating arm of the vehicle suspension to the anti-roll bar, the anti-roll bar link comprising:
an elongate body having a central bore defining an inner chamber configured to retain a damping fluid, the elongate body having an aperture at a distal end of the body;
a shaft couplable at a distal end to one of the anti-roll bar and the articulating arm, the shaft extending through the aperture and having a piston fixed to a proximal end of the shaft and slidingly disposed within the inner chamber;
a reservoir body enclosing a remote chamber fluidly coupled to the inner chamber through a passageway;
a valve configured to selectively control flow of the damping fluid within the passageway, the valve positionable between a locked state for restricting the flow of the damping fluid from the inner chamber to the remote chamber, and an unlocked state for permitting the flow of the damping fluid from the inner chamber to the remote chamber;
a reflow passageway bypassing the valve and fluidly coupling the inner chamber and the remote chamber; and
a check valve selectively controlling flow of the damping fluid through the reflow passageway by permitting flow only in a direction from the remote chamber to the inner chamber during retraction of the anti-roll bar link toward a parked position,
wherein, in the locked state, the movement of the articulating arm is transferred through the anti-roll bar link to the anti-roll bar, and
wherein, in the unlocked state, the movement of the articulating arm causes the piston to travel within the inner chamber such that at least a portion of the movement of the articulating arm is not transferred to the anti-roll bar.

12. The anti-roll bar system of claim 11, wherein the valve is configured to transition between the locked state and the unlocked state by mechanical manipulation of the valve.

13. The anti-roll bar system of claim 12, wherein the valve is a spool valve rotatable between the locked state and the unlocked state to selectively permit damping fluid flow within the passageway.

14. The anti-roll bar system of claim 11, wherein the valve is configured to transition between the locked state and the unlocked state in response to an electronic signal received by the valve.

15. The anti-roll bar system of claim 14, wherein the valve is a solenoid valve configured to selectively apply a magnetic force to a plunger slidable between a first position in the locked state and a second position in the unlocked state to selectively permit damping fluid flow within the passageway.

16. The anti-roll bar system of claim 15, further comprising a plunger spring that applies a biasing force to the plunger in a direction away from the second position toward the first position, wherein the biasing force is less than the magnetic force.

17. The anti-roll bar system of claim 11, further comprising a floating piston slidingly disposed in the remote chamber, the floating piston sealingly partitioning the remote chamber into a first portion in fluid communication with the inner chamber by the passageway, and a second portion configured to retain a pressurized gas for applying a restoring force to the floating piston toward the first portion, urging the damping fluid in the first portion to return to the inner chamber.

18. The anti-roll bar system of claim 11, further comprising a damping component positioned between the inner chamber and the remote chamber to throttle the flow from the inner chamber to the remote chamber.

19. The anti-roll bar system of claim 11, further comprising a proximal mount couplable to an intermediate axial position on the elongate body, the proximal mount configured to couple to the other of the anti-roll bar and the articulating arm.

20. The anti-roll bar system of claim 19, wherein the elongate body further comprises a plurality of circumferential indentations corresponding to axial positioning features of the proximal mount on the elongate body, and wherein the proximal mount is configured to interface with at least one of the plurality of circumferential indentations to axially fix the proximal mount with respect to the elongate body.

* * * * *